United States Patent
Khatwa

(10) Patent No.: US 7,330,147 B2
(45) Date of Patent: Feb. 12, 2008

(54) SYSTEM AND METHOD FOR GROUND PROXIMITY WARNING WITH ENHANCED OBSTACLE DEPICTION

(75) Inventor: Ratan Khatwa, Sammamish, WA (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 10/907,934

(22) Filed: Apr. 21, 2005

(65) Prior Publication Data
US 2006/0238402 A1    Oct. 26, 2006

(51) Int. Cl.
G01S 13/93 (2006.01)
G08G 5/04 (2006.01)
G01S 13/00 (2006.01)

(52) U.S. Cl. .......................... 342/29; 342/27; 342/118; 342/175; 342/176; 342/182; 342/195; 342/33; 342/36; 701/300; 701/301; 340/945

(58) Field of Classification Search ................ 340/945, 340/961, 963, 964, 971, 973, 983; 701/300, 701/301; 342/27–51, 118–123, 175–186, 342/195, 63–65
See application file for complete search history.

(56) References Cited

U.S. PATENT DOCUMENTS

| 3,191,169 | A | * | 6/1965 | Shulman et al. ............... 342/36 |
| 3,750,166 | A | * | 7/1973 | Dearth ......................... 342/30 |
| 5,554,990 | A | * | 9/1996 | McKinney ................... 342/36 |
| 6,538,581 | B2 | * | 3/2003 | Cowie ......................... 340/961 |
| 6,744,396 | B2 | * | 6/2004 | Stone et al. .................. 342/36 |
| 6,911,936 | B2 | * | 6/2005 | Stayton et al. ............. 342/182 |
| 2001/0035831 | A1 | | 11/2001 | Block |
| 2003/0132876 | A1 | | 7/2003 | Block |
| 2003/0137444 | A1 | * | 7/2003 | Stone et al. .................. 342/30 |
| 2003/0179109 | A1 | | 9/2003 | Chamas et al. |
| 2003/0193411 | A1 | | 10/2003 | Price |
| 2004/0252046 | A1 | * | 12/2004 | Mork et al. ................... 342/29 |
| 2005/0035898 | A1 | * | 2/2005 | Shiomi et al. ................ 342/36 |

FOREIGN PATENT DOCUMENTS

| GB | 2115633 A | 9/1983 |
| WO | 0039775 A | 7/2000 |

* cited by examiner

Primary Examiner—Bernarr E. Gregory
(74) Attorney, Agent, or Firm—Black Lowe & Graham PLLC

(57) ABSTRACT

Systems and methods for displaying ground obstructions on a visual display are disclosed. In an embodiment, a ground proximity warning system includes at least one aircraft sensor system operable to acquire aircraft data and a ground proximity warning computer coupled to the aircraft sensor system to process the aircraft data that generates ground proximity warning data corresponding to a sensed ground obstruction. An indicating system including a visual display device then presents an image of a visual symbol corresponding to the sensed ground obstruction. At least one of the computer and the visual display device is controllable to selectively display the visual symbol.

19 Claims, 6 Drawing Sheets

SYSTEM AND METHOD FOR GROUND PROXIMITY WARNING WITH ENHANCED OBSTACLE DEPICTION

BACKGROUND OF THE INVENTION

Ground proximity warning systems (GPWS) are known and are presently installed on a wide variety of aircraft. Such systems generally provide both aural and visual warnings of inadvertent aircraft descent during flight operations. For example, a GPWS may be configured to detect an excessive loss of altitude during a landing procedure, following a take-off, or during a go-around following a missed approach. The GPWS also advantageously provides aural and visual warnings of potential terrain collisions during controlled flight over relatively high altitude terrain. In general, the GPWS detects an altitude loss by computing a barometric altitude (MSL) and a descent rate based upon changes in the barometric pressure. In cases where the terrain underlying the aircraft is rising relative to the aircraft, a radio altitude is computed in order to determine an altitude above ground level (AGL).

Although present GPWS significantly enhance the safety of flight, other potentially hazardous man-made obstructions nevertheless exist. For example, radio transmission towers, smokestacks and other similar structures abruptly project outwardly from the terrain. Obstructions of the foregoing type are generally depicted in various aeronautical publications (including, for example, the well-known terminal area chart (TAC), sectional aeronautical chart (SAC) and world aeronautical chart (WAC) and may also be represented in a variety of commonly available navigational databases.

What is needed in the art is a system and method for displaying ground obstructions on a visual display so that ground obstructions may be effectively recognized.

BRIEF SUMMARY OF THE INVENTION

In one embodiment the present invention includes systems and methods for displaying ground obstructions on a visual display. In one aspect, a ground proximity warning system includes at least one aircraft sensor system operable to acquire aircraft data and a ground proximity warning computer coupled to the aircraft sensor system to process the aircraft data that generates ground proximity warning data corresponding to a sensed ground obstruction. An indicating system including a visual display device presents an image of a visual symbol corresponding to the sensed ground obstruction. At least one of the computer and the visual display device is controllable to selectively display the visual symbol.

BRIEF DESCRIPTION OF THE SEVERAL VIEWS OF THE DRAWING

The preferred and alternative embodiments of the present invention are described in detail below with reference to the following drawings.

DETAILED DESCRIPTION OF THE INVENTION

The present invention relates to ground proximity warning systems and methods. Many specific details of certain embodiments of the invention are set forth in the following description and in FIGS. 1 through 6 to provide a thorough understanding of such embodiments. One skilled in the art, however, will understand that the present invention may have additional embodiments, or that the present invention may be practiced without several of the details described in the following description.

Figure 1:
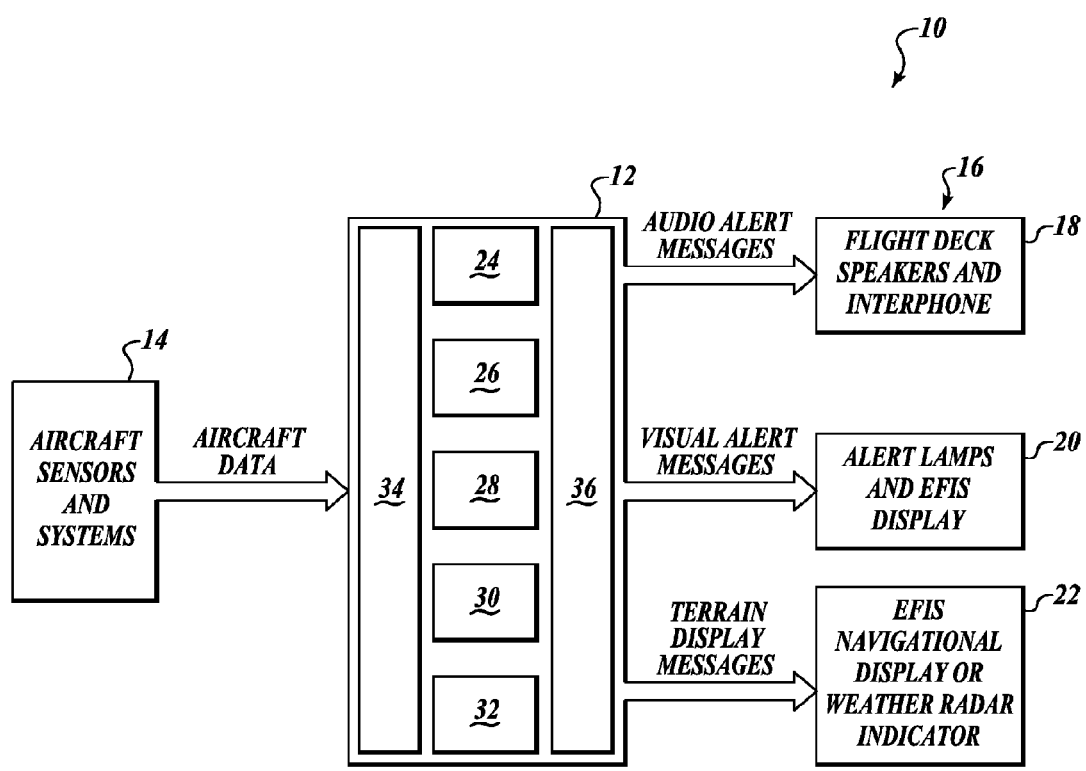
FIG. 1 is a block diagrammatic view of a ground proximity warning system according to an embodiment of the invention.

FIG. 1 is a block diagrammatic view of a ground proximity warning system 10 according to an embodiment of the invention. The system 10 includes a ground proximity-warning computer 12 that is coupled to a plurality of aircraft sensors 14 and associated systems, including, for example, pitot-static sensors and an air data system. The system 10 is also coupled to one or more indicating systems 16, which are operable to convey audio and/or visual warnings to a flight crewmember. Accordingly, the one or more indicating systems 16 may include a flight deck speaker and interphone system 18, an alert lamp and electronic flight instrument system (EFIS) indicating system 20, and an EFIS navigational display and weather radar display system 22. The indicating systems 16 may also be coupled to various devices that permit a flight crewmember to communicate with the system 10. For example, the various devices may include a voice actuation device, a keyboard, a pointing device, including a "mouse" or a trackball, or other similar devices operable to transfer commands to the system 10.

The ground proximity-warning computer 12 includes one or more processors or computer program components that are configured to perform a variety of functions. For example, the computer 12 may include a ground proximity warning system (GPWS) processor 24 that is operable to execute various algorithms to detect a ground (or obstacle) proximity event. The computer 12 also includes an aural callout processor 26 operable to generate audio warnings associated with ground (or obstacle) proximity events. The computer 12 also includes a terrain awareness and obstacle alerting processor 28 that is operable to process information from the sensors 14 and to execute algorithms so that appropriate warnings based upon the terrain or obstacles may be obtained. A terrain clearance floor processor 30 may also be present in the computer 12. The terrain clearance floor processor 30 processes terrain floor algorithms to generate terrain floor information for display. A windshear detection and alerting processor 32 processes windshear algorithms and similarly generates windshear information for display. The computer 12 also includes an input processing module that processes the signals obtained from the aircraft sensors and sensors 14 to appropriately format the signals prior to transferring the signals to the GPWS processor 24, the aural callout processor 26, the terrain awareness and obstacle alerting processor 28, the terrain clearance floor processor 30, and the windshear detection and alerting processor 32. An output processor 36 receives processed signals from the GPWS processor 24, the aural callout processor 26, the terrain awareness and obstacle alerting processor 28, the terrain clearance floor processor 30, and the windshear detection and alerting processor 32 and appropriately formats the processed signals before transferring the signals to the flight deck speaker and interphone system 18, the alert lamp and electronic flight instrument system (EFIS) indicating system 20, and the EFIS navigational display and weather radar display system 22.

Figure 2:
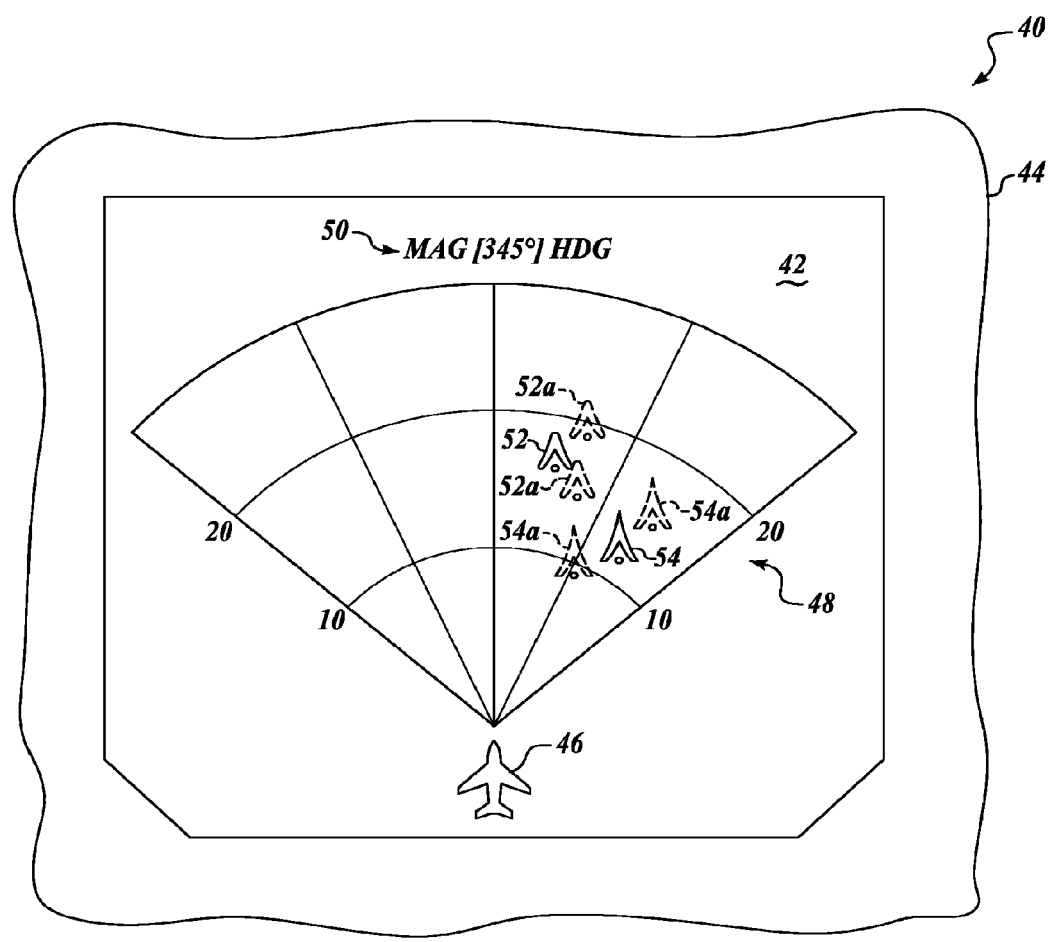
FIG. 2 is a ground obstacle depiction according to another embodiment of the invention.

FIG. 2 is a ground obstacle view 40 of an example of another embodiment of the invention. The ground obstacle view 40 may presented to a viewer, such as a flight crew member, on a viewing surface 42 of a terrain awareness display (TAD) 44 positioned on an aircraft flight deck. The TAD 44 may be the foregoing EFIS navigational display and weather radar display system 22 of FIG. 1, or other similar display devices. The TAD 44 is generally configured to display a symbolic representation 46 of the aircraft, and a viewing sector 48 that includes a graphical representation of at least one of terrain obstructions, aircraft traffic, navigational information and/or weather obstructions within a predetermined range and bearing relative to the aircraft. The viewing sector 48 also typically includes a directional bearing 50 of the aircraft. In general, the range of the viewing sector 48 is selectable by the flight crewmember to provide a desired resolution on the viewing surface 42.

Still referring to FIG. 2, the viewing sector 48 also includes a first ground obstruction symbol 52 and a second ground obstruction symbol 54. The symbols 52 and 54 as shown in FIG. 2 generally conform to ICAO standards for obstruction symbology. Accordingly, the symbol 52 may represent a ground obstacle such as a radio transmission antenna or a smokestack, or other similar obstructions that do not extend more than one-thousand feet above the underlying terrain (AGL), while the symbol 54 represents an obstruction that extends more than one-thousand feet AGL. In a particular embodiment of the invention, however, a selected one of the symbol 52 and the symbol 54 are used to represent a ground obstruction within the viewing sector 48. In other embodiments of the invention, other symbols that do not conform to the ICAO standard may also be used to indicate obstructions within the viewing sector 48. In either case, the symbol 52 and the symbol 54 are presented for display within the viewing sector 48 when a top portion of the ground obstruction corresponding to the symbols 52 and 54 is within a predetermined distance of the aircraft, while other ground obstructions not within the predetermined distance are not displayed. Accordingly, the symbols 52 and 54 are displayed, since they are within the predetermined distance, while other ground obstructions, as represented by the symbols 52a and/or 54a are not shown on the viewing surface 42, because a top portion is not within the predetermined distance of the aircraft. In one particular embodiment, the predetermined distance is approximately about two-thousand feet.

Figure 3:
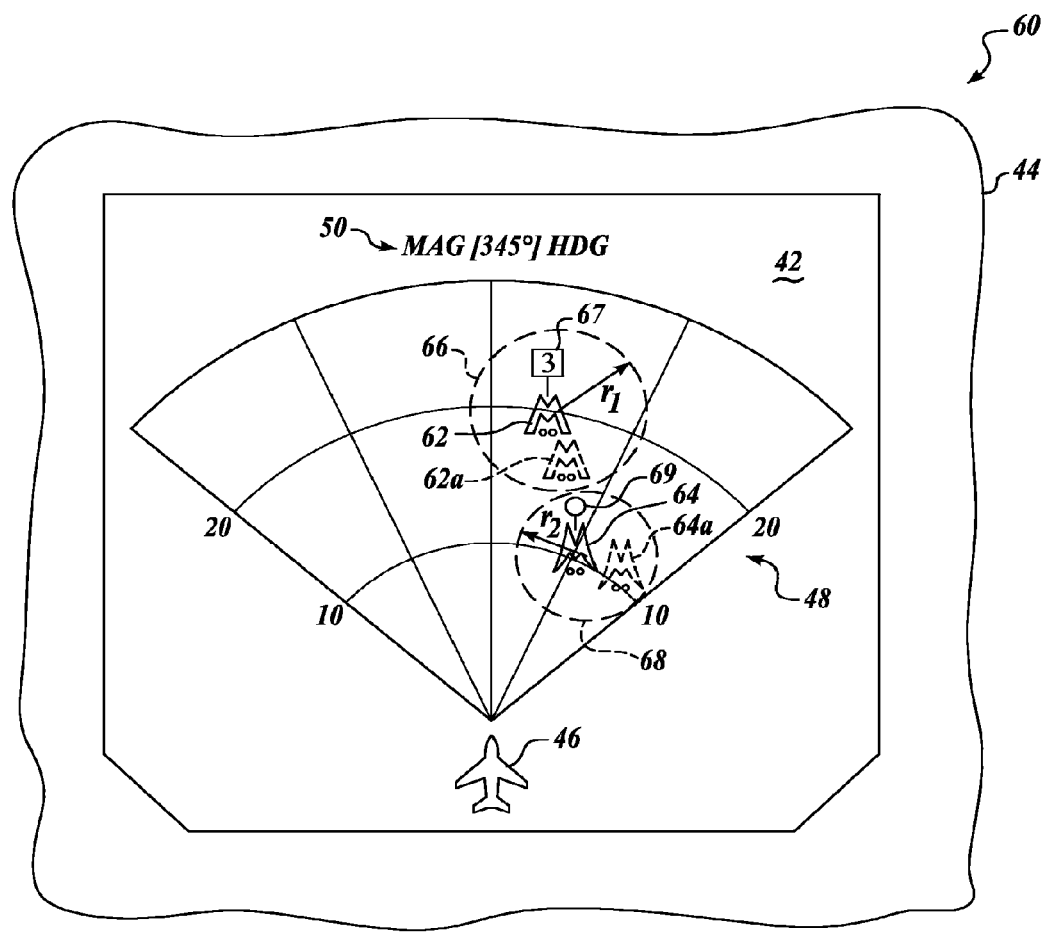
FIG. 3 is a ground obstacle depiction according to still another embodiment of the invention.

FIG. 3 is a ground obstacle depiction 60 illustrates still another embodiment of the invention. The viewing sector 48 includes a first group obstruction symbol 62 and a second group obstruction symbol 64. The symbols 62 and 64 of FIG. 3 also generally conform to ICAO standards for obstruction symbology. Accordingly, the symbol 62 may represent a group obstruction such as a radio antenna farm or an industrial installation having a plurality of towers or smokestacks, or other similar collections of obstructions. In conformity with the ICAO standard, the symbol 62 is representative of a group obstacle that does not extend more than one-thousand feet above the underlying terrain (AGL), while the symbol 64 is representative of a group obstruction that extends more than one-thousand feet AGL. In a particular embodiment of the invention, however, a selected one of the symbols 62 and 64 are used to represent a group obstruction within the viewing sector 48. In other embodiments of the invention, however, other symbols that do not conform to the ICAO standard may be used to indicate group obstructions within the viewing sector 48. In either case, the symbol 62 and the symbol 64 are presented for display within the viewing sector 48 when a top portion of the group obstruction corresponding to the symbols 62 and 64 are within a predetermined distance of the aircraft, while other group obstructions not within the predetermined distance are not displayed. Accordingly, the symbols 62 and 64 are displayed, since they are within the predetermined distance, while other ground obstructions, as represented by the symbols 62a and/or 64a are not shown on the viewing surface 42, because a top portion is not within the predetermined distance of the aircraft. The areas 66 and/or 68 may also optionally display a first identifier 67 that indicates a total number of ground obstructions present in the areas 66 and/or 68, although the ground obstructions are not shown. Alternately, a second identifier 69 may be present that is used to indicate that more than one obstruction is present in the areas 66 and/or 68 without presenting a value for the total number of obstructions within the areas 66 and/or 68.

With continued reference to FIG. 3, the obstacle depiction 60 includes a first area 66 that encloses the first group obstruction symbol 62 that extends outwardly from the symbol 62 a predetermined first distance $r_1$. Since the first group obstruction symbol 62 represents a group obstruction having a top portion that is within a predetermined distance of the aircraft, other group obstacles that are located within the first area 66 that have a top portion that is greater than the predetermined distance are not shown in the sector 48. Similarly, a second area 68 encloses the second group symbol 64 that extends outwardly from the second group symbol 64 a predetermined second distance $r_2$. Again, since the second group symbol 64 represents a group obstruction with a top portion that is within a predetermined distance of the airplane, all other group obstructions within the area 68 are not shown in the sector 48. Although the areas 66 and 68 are shown as circular areas, it is understood that the areas 66 and 68 may also have a variety of different shapes, such as rectangles, and even regular or non-regular polygonal shapes.

Figure 4:
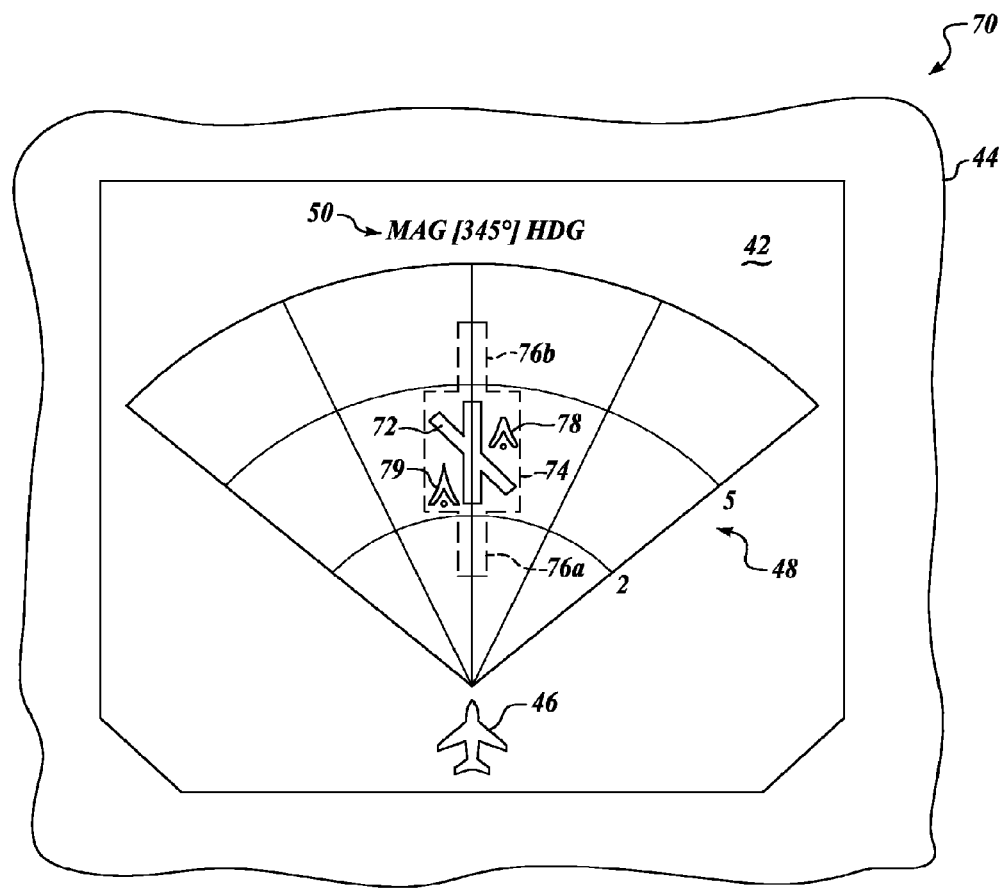
FIG. 4 is a ground obstacle depiction according to still yet another embodiment of the invention.

FIG. 4 is a ground obstacle depiction 70 that illustrates still yet another embodiment of the invention. The viewing sector 48 includes a representation of an airport runway structure 72 that has an area 74 that includes the runway structure 72. The area 74 may also optionally include extension regions 76a and 76b to accommodate approach and departure regions corresponding to the runway structure 72. The ground obstacle depiction 70 also includes a first ground obstruction 78 and a second ground obstruction 79. The first ground obstruction 78 may be displayed if the vertical distance between a top portion of the obstruction 78 and the aircraft is less than a predetermined distance. In a particular embodiment, the predetermined distance is about one hundred feet. The second ground obstruction 79 may be displayed the vertical or lateral distance between the obstruction 79 and the aircraft is less than a predetermined distance. In another particular embodiment, the predetermined distance is about one hundred feet.

Figure 5:
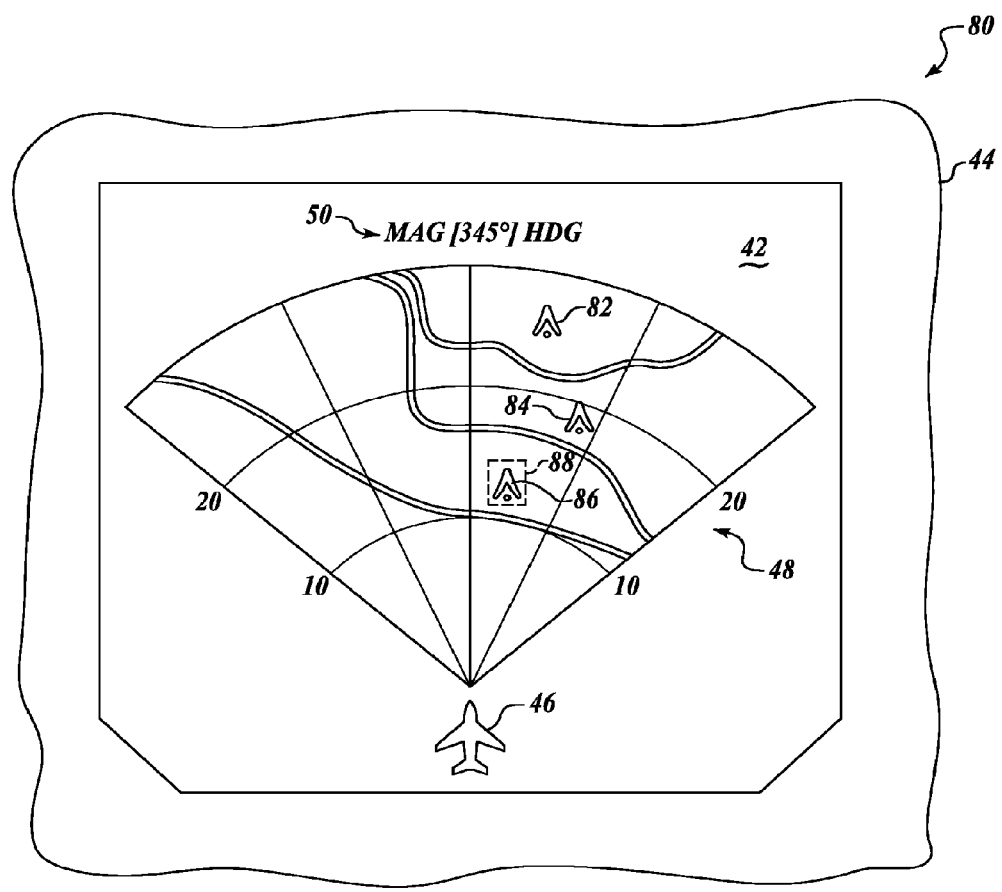
FIG. 5 is a ground obstacle depiction according to another embodiment of the invention.

FIG. 5 is a ground obstacle depiction 80 that will be used to describe a method of display management according to still yet another embodiment of the invention. As described more fully above, the TAD 44 is operable to display terrain elevations relative to the altitude of the aircraft. For example, a terrain elevation that is more than two-thousand feet below an aircraft altitude typically appears as a black area on the viewing surface 42, while a terrain elevation that is between approximately two-thousand feet below the aircraft altitude and up to the aircraft altitude is shown as a green area on the viewing surface 42. Terrain having an elevation that is above the aircraft altitude is shown as a yellow area if the terrain is between the aircraft altitude and extending up to approximately two-thousand feet above the aircraft altitude. If a terrain elevation is more than about two-thousand feet above the altitude of the aircraft, it is typically shown as a red area on the viewing surface 42. Accordingly, a first ground obstruction 82 is depicted with a first color if the obstruction 82 is a predetermined first distance relative to the aircraft altitude, while a second ground obstruction 84 is depicted with a second color if the ground obstruction 84 is a predetermined second distance relative to the aircraft altitude. A third color may be used to depict a third ground obstruction 86 when the obstruction 86 is a predetermined third distance relative to the aircraft. In a particular embodiment, the first color is red, and the first distance is more than two-thousand feet above the aircraft altitude, the second color is yellow, and the second distance extends from about five hundred feet below the aircraft altitude to about two-thousand feet above the aircraft altitude, while the third color is blue/cyan (or other colors) and the third distance is at least five hundred feet below the aircraft altitude to about two-thousand feet below the aircraft altitude. Since the first ground obstruction 82, the second ground obstruction 84 and the third ground obstruction 86 may overlay terrain elevation depictions having similar or even identical colors, the ground obstructions 82, 84 and 86 may include a background pane 88 having a color that provides a desired visual contrast level between the ground obstructions 82, 84 and 86 and the terrain depiction. Alternately, the ground obstructions 82, 84 and 86 may include an outline portion that substantially surrounds the ground obstructions 82, 84 and 86 in order to provide the desired visual contrast.

Figure 6:
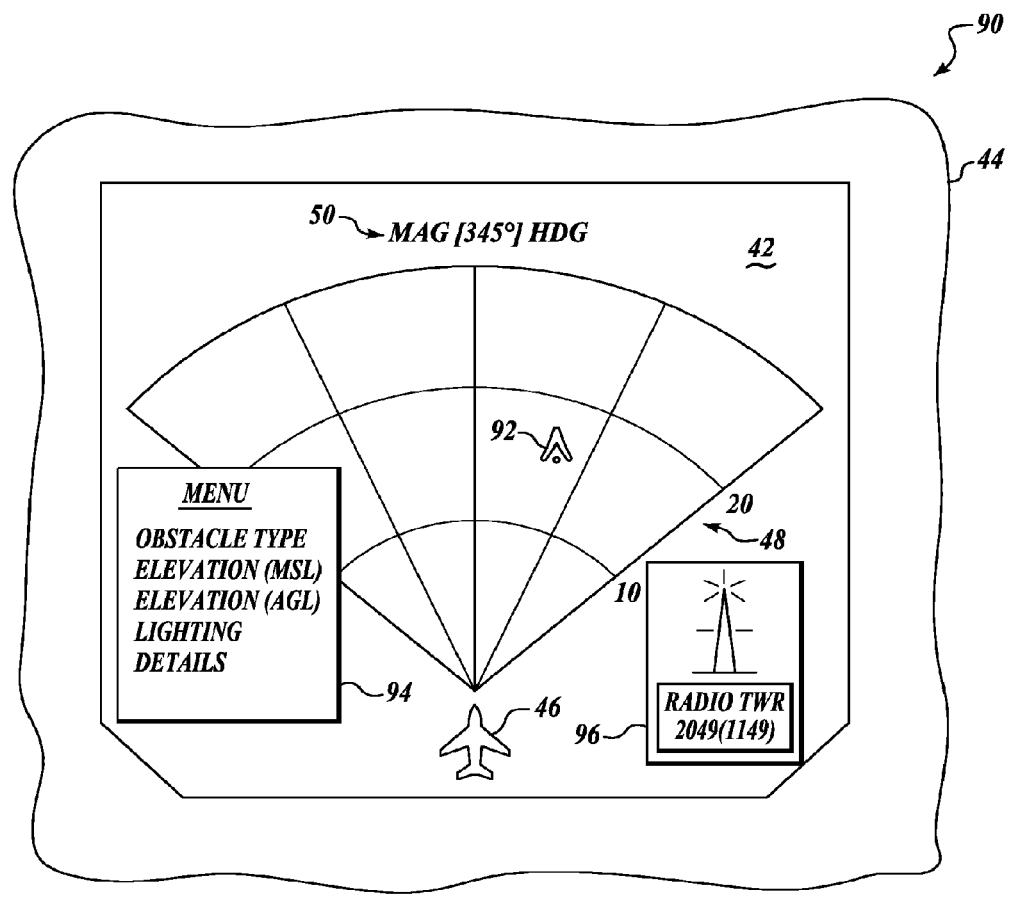
FIG. 6 is a ground obstacle depiction according to an embodiment of the invention.

FIG. 6 is a ground obstacle depiction 90 that illustrates another embodiment of the invention. As described more fully above, the system 10 (as shown in FIG. 1) includes devices operable to transfer commands to the system 10 by pointing to a visual image presented on the TAD 44. Accordingly, a ground obstruction 92 may be selected by pointing the device to the ground obstruction 92 and highlighting the obstruction 92. In one embodiment, a information box 94 is then displayed on the viewing surface 42 that includes one or more user options. The user options presented in the information box 94 may be individually selected, and may include a description of obstacle type, an elevation of the obstacle relative to mean sea level (MSL), an elevation of the obstacle relative to a ground elevation (AGL), lighting associated with the obstacle, such as "high intensity strobe", "red marker lights" or other similar descriptions. The information box 94 may also include other details associated with the obstacle, which may include an image 96 of the obstruction 92. The information box 94 may include a pictorial representation of the obstruction 92 that includes particular details such as an elevational view and/or a lighting installation present on the obstruction 92. Additionally, an informational box may be included in the image 96 that presents a written description of the obstruction 92, such as "radio twr" and/or elevational information associated with the obstruction 92. The information box 94 may include menu item.

While the preferred embodiment of the invention has been illustrated and described, as noted above, many changes can be made without departing from the spirit and scope of the invention. Also, the steps in the process 100 may be performed in various order. Accordingly, the scope of the invention is not limited by the disclosure of the preferred embodiment. Instead, the invention should be determined entirely by reference to the claims that follow.

What is claimed is:

1. A system for an aircraft, comprising:
at least one aircraft sensor system operable to acquire aircraft data;
a ground proximity warning computer coupled to the at least one aircraft sensor system that is operable to process the aircraft data to generate ground proximity warning data corresponding to a distance between a sensed ground obstruction and the aircraft; and
an indicating system including at least one visual display device that is configured to display an image of a visual symbol corresponding to the sensed ground obstruction, wherein at least one of the computer and the at least one visual display device is controllable to selectively display the visual symbol,
wherein at least one of the computer and the at least one visual display device is further operable to display terrain elevations, and at least one of the computer and the at least one visual display device is controllable to suppress the terrain elevations while displaying the visual symbol.

2. The system of claim 1, wherein the at least one visual display device is further operable to display terrain elevations, and at least one of the computer and the at least one visual display device is controllable to suppress the visual symbol while displaying the terrain elevations.

3. The system of claim 2, wherein at least one of the computer and the at least one visual display device is configured to automatically display a suppressed visual symbol when the corresponding sensed ground obstruction is within a predetermined range of the aircraft.

4. The system of claim 2, wherein at least one of the computer and the at least one visual display device is configured to automatically display a suppressed visual symbol when the corresponding sensed ground obstruction is within a predetermined bearing relative to the aircraft.

5. The system of claim 1, wherein the visual symbol includes a first portion and a second portion, and further wherein at least one of the computer and the at least one visual display device is controllable to display the first portion while suppressing the second portion.

6. A method comprising:
displaying terrain elevations on a visual display device;
displaying at least one visual symbol corresponding to a sensed ground obstruction on the visual display device; and
controllably altering the visual display device to display a selected one of the terrain elevations and the at least one visual symbol,
wherein controllably altering the visual display device further comprises displaying the at least one visual symbol and suppressing the terrain elevations.

7. The method of claim 6, wherein controllably altering the visual display device further comprises displaying the terrain elevations and suppressing the at least one visual symbol.

8. The method of claim 6, wherein controllably altering the visual display device further comprises controlling a selected one of a ground proximity warning computer and an indicating system coupled to the computer to alter the visual display device.

9. A method of display management for an aircraft ground proximity warning system, comprising:
- generating visual symbols corresponding to sensed ground obstructions that are configured to be displayed on a visual display device;
- displaying terrain elevations on a display device;
- detecting a selected ground obstruction that is within a predetermined zone that extends outwardly from the aircraft;
- displaying the generated symbol corresponding to the selected ground obstruction on the display device, and
- at least of suppressing one of the visual symbols or displaying an alternate visual symbol based on a selected range setting for the display device.

10. The method of claim 9, wherein generating the visual symbols further comprises generating the visual symbols in at least one of a ground proximity warning computer and an indicating system coupled to the ground proximity warning computer.

11. The method of claim 9, wherein the display device includes a terrain awareness display (TAD).

12. The method of claim 9, wherein detecting a selected ground obstruction further comprises detecting the selected ground obstruction is within a predetermined range and bearing relative to the aircraft.

13. The method of claim 9, wherein detecting a selected ground obstruction further comprises detecting the ground obstruction is less than a predetermined distance from the aircraft.

14. The method of claim 13, wherein detecting the ground obstruction is less than the predetermined distance from the aircraft further comprises determining one of a vertical distance between a portion of the detected ground obstruction and the aircraft, and determining a slant range between the obstacle and the aircraft.

15. A method of display management for an aircraft ground proximity warning system, comprising:
- displaying at least one visual symbol corresponding to a sensed ground obstruction on a visual display device, the visual symbol having a first portion and a second portion;
- selecting a display mode for the visual display device, wherein a first display mode is operable to display the first portion and the second portion of the visual symbol, and a second display mode is operable to display the first portion of the visual symbol while suppressing the second portion; and
- selecting a display range, and if the selected display range is less that a predetermined range value, displaying the first and the second portion, and if the display range is greater than a predetermined range value, displaying the first portion only.

16. The method of claim 15, wherein displaying at least one visual symbol further comprises displaying an ICAO symbol.

17. A system for an aircraft, comprising:
- at least one aircraft sensor system operable to acquire aircraft data;
- a ground proximity warning computer coupled to the at least one aircraft sensor system that is operable to process the aircraft data to generate ground proximity warning data corresponding to a distance between a sensed ground obstruction and the aircraft; and
- an indicating system including at least one visual display device that is configured to display an image of a visual symbol corresponding to the sensed ground obstruction, wherein at least one of the computer and the at least one visual display device is controllable to selectively display the visual symbol,
- wherein at least one of the computer and the at least one visual display device is configured to selectably alter a range setting for the at least one visual display device, further wherein at least one visual symbol is suppressed or an alternate visual symbol is displayed when a predetermined range value is selected.

18. The system of claim 17, wherein the predetermined range value is at least about ten nautical miles.

19. A method of display management for an aircraft ground proximity warning system, comprising:
- displaying at least one visual symbol corresponding to a second ground obstruction on a visual display device, the visual symbol having a first portion and a second portion; and
- selecting a display mode for the visual display device, wherein a first display mode is operable to display the first portion and the second portion of the visual symbol, and a second display mode is operable to display the first portion of the visual symbol while suppressing the second portion,
- wherein displaying an ICAO symbol further comprises displaying a chevron portion of the symbol when operating in the first display mode, and suppressing the chevron portion when operating in the second display mode.

* * * * *